United States Patent [19]

Araya et al.

[11] Patent Number: 5,354,548
[45] Date of Patent: * Oct. 11, 1994

[54] POROUS THREE-DIMENSIONAL INORGANIC OXIDE STRUCTURE WITH MYRIAD CAVITIES INTERCONNECTED BY HOLES

[75] Inventors: Abraham Araya, Merseyside, England; Anthony L. Lovell, Clwyd, Wales

[73] Assignee: Unilever Patent Holdings B.V., Rotterdam, Netherlands

[*] Notice: The portion of the term of this patent subsequent to Dec. 19, 2006 has been disclaimed.

[21] Appl. No.: 970,237

[22] Filed: Nov. 2, 1992

Related U.S. Application Data

[63] Continuation of Ser. No. 857,257, Apr. 30, 1986, abandoned.

[30] Foreign Application Priority Data

May 1, 1985 [GB] United Kingdom ................. 8511048

[51] Int. Cl.$^5$ ..................... C01B 13/14; C01B 33/12; C01B 33/26; C01F 7/02
[52] U.S. Cl. .................... 423/700; 423/326; 423/327.1; 423/328.1; 423/328.2; 423/330.1; 423/332; 423/333; 423/335; 423/338; 423/339; 423/593; 423/598; 423/600; 423/610; 423/625; 501/133; 501/134
[58] Field of Search ................ 264/42.43; 502/8, 232, 502/233, 407, 411; 501/85, 88, 133, 134; 252/174, 174.25, 315.5, 315.6; 428/304.4, 312.6, 312.8; 423/326, 331, 332, 333, 335, 338, 339, 593, 598, 600, 610, 611, 616, 625, 626, 327.1, 328.1, 328.2, 330.1, 700

[56] References Cited

U.S. PATENT DOCUMENTS

| | | | |
|---|---|---|---|
| 2,422,499 | 6/1947 | Pierce et al. | 423/333 |
| 3,417,028 | 12/1968 | Montgomery et al. | 423/338 |
| 3,682,996 | 8/1972 | Kerr | 556/173 |
| 3,857,924 | 12/1974 | Halasz et al. | 423/338 |
| 3,898,322 | 8/1975 | Leach | 423/628 |
| 4,011,096 | 3/1977 | Sandell | 423/335 |
| 4,011,302 | 3/1977 | Defrawi et al. | 423/332 |
| 4,090,887 | 5/1978 | Marquisee et al. | 423/338 |
| 4,190,457 | 2/1980 | McDaniel | 106/122 |
| 4,315,839 | 2/1982 | Bouge et al. | 423/628 |
| 4,451,572 | 5/1984 | Cody | 556/9 |
| 4,554,211 | 11/1985 | Arika et al. | 423/338 |
| 4,654,314 | 3/1987 | Takagi et al. | 501/85 |
| 4,888,309 | 12/1989 | Araya | 501/80 |

FOREIGN PATENT DOCUMENTS

| | | |
|---|---|---|
| 0381405 | 9/1923 | Fed. Rep. of Germany . |
| 1037502 | 7/1966 | United Kingdom . |
| 1555230 | 11/1979 | United Kingdom . |

*Primary Examiner*—Jeffrey E. Russel
*Attorney, Agent, or Firm*—Cushman, Darby & Cushman

[57] ABSTRACT

This invention provides a three dimensional inorganic oxide structure comprising a myriad of cavities interconnected by holes having a narrow pore size distribution, in which the diameters of the cavities is in the range from 1 to 50 $\mu$m and that of the holes in the range 1 to 10 $\mu$m and in which the pore volume in the range 1 to 10 $\mu$m is at least 2 cc/g and in which the inorganic oxide is selected from alumina, silica, titania, zirconia and mixtures thereof and a process for the preparation of such structures.

9 Claims, 7 Drawing Sheets

POROUS THREE-DIMENSIONAL INORGANIC OXIDE STRUCTURE WITH MYRIAD CAVITIES INTERCONNECTED BY HOLES

This is a continuation of application Ser. No. 06/857,257, filed on Apr. 30, 1986, which was abandoned upon the filing hereof.

This invention relates to a new thermally stable, highly porous, three dimensional inorganic structure, having a myriad of cavities interconnected by holes of a very narrow pore size distribution, making them suitable for various industrial and research applications.

A wide variety of methods is known for the preparation of porous silica particles. GB Patent No 1 555 230 discloses preparation of vesiculated silica microspheres from multiple emulsion systems. But the ratio of the internal phase is <50% by volume and according to the text and diagram given in the disclosure, the vesicles are discrete rather than interconnected. Another process for making oxide microspheres with uniform sized pores by copolymerising organic components in the said oxide sols and burning out the organic component is disclosed in U.S. Pat. No. 3,855,172. Although the patent claims that the product has uniform pores, the porosity obtained between 1 to 10 $\mu$m is as a result of filling spaces between microspheres and moreover the cumulative porosity of the said product is less than 1.3 cc/g and the porosity between 1 to 10 $\mu$m is less than 0.8 cc/g.

Finally, U.S. Pat. No. 3,526,602 discloses a process for making a narrow pore size distribution in the form of granules interconnected by a sintered inorganic bonding material. But the pore diameter of the said product is greater than 100 $\mu$m with a cumulative porosity of less than 0.6 cc/g.

The present invention provides a three dimensional inorganic oxide structure comprising a myriad of cavities interconnected by holes having a narrow pore size distribution, in which the diameters of the cavities is in the range from 1 to 50 $\mu$m and that of the holes in the range 1 to 10 $\mu$m and in which the pore volume in the range to 10 $\mu$m is at least 2 cc/g and in which the inorganic oxide is selected from alumina, silica, titania, zirconia and mixtures thereof.

The invention also provides a process for preparing the above-mentioned structures comprising:
(a) the formation of an oil-in-water emulsion having an oil phase by volume >50% by contacting an aqueous solution of a precursor of the inorganic oxide with a water-immiscible fluid in the presence of an appropriate emulsifying agent,
(b) gelling the continuous aqueous phase of the emulsion by the addition of a gelling agent, or by allowing the emulsified inorganic sol to set with time.

Preferably, the fluid is an organic liquid and, desirably, a volatile organic liquid which can readily be removed from the structure.

In a preferred form of the process, the water-immiscible fluid is removed from the structure and, optionally, any electrolytes can be washed out and the inorganic structure dried. The preferred pore volume of the product between 1 and 10 $\mu$m is preferably between 2 and 8 cc/g on a dried product.

Pore volumes of up to about 50 cc/g can be obtained in the wet state but on drying these values are generally reduced, but if water, for example, is exchanged for another liquid the pore volume is little changed.

The water-immiscible fluid used in the process of this invention will be a factor in deciding on an appropriate emulsifying agent and suitable information can be obtained from any textbooks such as Surface Active Agents (Schwartz, M. A., & Perry, W.J., Interscience Publishers, New York, 1974. The essential requirement is that a relatively stable oil-in-water emulsion is produced and the production of this emulsion will be facilitated by suitable emulsification apparatus including slow or high speed stirrer or vibration mixer.

Preferred combinations of solvent and emulsifying agent are an amphoteric surfactant and a volatile hydrocarbon such as cyclohexane. This combination is particularly preferred when the silica-based structures are prepared. For the preparation of alumina structures the preferred combination comprises a nonionic surfactant and a volatile hydrocarbon.

Suitable precursors of the inorganic oxide include alkali-metal aluminates, silicates, titanates and zirconates or various water-soluble salts of these metals which, with appropriate chemical treatment, yield the related oxide or hydroxide. In addition, sols of these materials constitute suitable precursors and may be used.

Set out below are details of the eleven figures accompanying this specification together with a reference to the relevant example.

The following examples will indicate the procedure for carrying out the invention and illustrate the general method of preparation.

EXAMPLE 1

Silica-sol containing 8% silica by weight was prepared by adding 80 mls of sodium silicate (SpGr=1.25) into 120 mls of sulphuric acid (SpGr=1.09) with vigorous agitation.

26 g of the prepared silica-sol and 0.1 g of anionic emulsifying agent (sodium-n-dodecyl sulphonate) was placed into a 250 ml glass beaker and stirred. 74 mls of glycerol trioleate was added dropwise into the stirred sol-surfactant mixture. After complete addition of the glycerol trioleate, stirring was continued for two minutes. A thick oil-in-water emulsion was formed. The emulsified-sol was allowed to stand and the whole content set into a gel-like product after about three hours.

20 g of the above prepared gel was slurried with 50 mls acetone and filtered. This operation was repeated four times with petroleum-ether to remove the oil from the product. Finally it was washed with acetone followed with water to remove electrolytes. The washed product in the form of a wet cake having a pore volume of 49 cc/g was later dried at 105° C.

Examination of the dried product by scanning electron microscopy (SEM) revealed a three dimensional network structure with cavities having interconnecting holes. The pore volume of the dried product between 1 to 10 $\mu$m as determined by mercury porosimetry was 2.4 cc/g.

EXAMPLE 2

26 g silica-sol containing 8% silica by weight and 0.15 g of a mixture of immidazoline-based amphoteric emulsifying agents (Miranol C2M-SF sold by Venture Chemical Products Limited, and Crodateric C sold by Croda Universal Limited) in the ratio of 1:1 were placed in 250 ml glass beaker and stirred. 74 mls of cyclohexane was added dropwise into the stirred sol-surfactant mixture. After complete addition of the cyclohexane, stirring was continued for two minutes. A thick oil-in-water emulsion was formed. The emulsified-sol was allowed to stand and the whole content set into a gel-like product in about three hours at room temperature.

15 g of the above prepared gel was freeze dried. The freeze dried product was washed with water and dried at 105° C. The pore volume of the dried product between 1 to 10 $\mu$m was 3.9 cc/g.

EXAMPLE 3

26 g of silica-sol containing 8% silica and 0.4 g $C_{12}$ alkane sulphonate were premixed in a 250 ml plastic beaker. 74 mls of cyclohexane was added to the sol-emulsifying agent mixture and stirred for three minutes using a vibro-mixer fitted with 65 mm stirrer-disc. The formed oil-in-water emulsion was allowed to stand and set in about four hours at room temperature.

The above product was first dried, under vacuum, then repeatedly washed with water and finally dried at 105° C. The pore volume of the washed and dried product between 1 to 10 $\mu$m was 4 cc/g and the specific surface area was 715 $m^2$/g. SEM of the product showed a three dimensional network structure with cavities interconnected by holes.

EXAMPLE 4

The procedure of Example 3 was repeated except that the silica-sol had 15% by weight silica, 0.4 g mixture of Miranol and Crodateric C in place of alkane sulphonate and 90 mls of cyclohexane were used. The pore volume of the dried product between 1 to 10 $\mu$m was 3.5 cc/g, and the specific surface area was 690 $m^2$/g. SEM of the product showed a three dimensional network structure with cavities interconnected by holes.

EXAMPLE 5

53 mls of neutral silicate ($SiO_2$:$Na_2O$=3.28 and 28.3% $SiO_2$) was diluted with 47 mls of water to give a silicate solution containing 15% $SiO_2$ by weight. The diluted silicate solution was premixed with 2 g of Miranol and Crodateric C in 600 ml plastic beaker. 360 mls of cyclohexane was added to the silicate-emulsifying agent mixture and stirred using a vibro mixer for three minutes. Part of the emulsified silicate was gelled by dropping into 5N sulphuric acid using a plastic dropping pipette. The gel was left in the acid for two hours at room temperature, then separated from the acid and rinsed with water to remove any adhering acid solution. The wet product has a pore volume of 27 cc/g and was then air dried and washed repeatedly with water and dried at 105° C.

Figure 3:
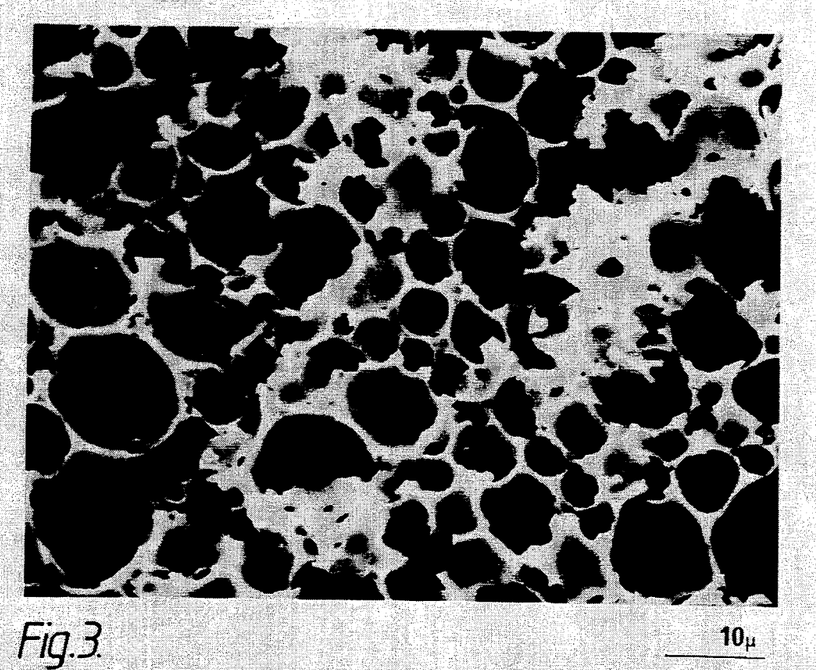
FIG. 3—Scanning electron micrograph of oven dried product of the present invention (Example 5).
Figure 4:
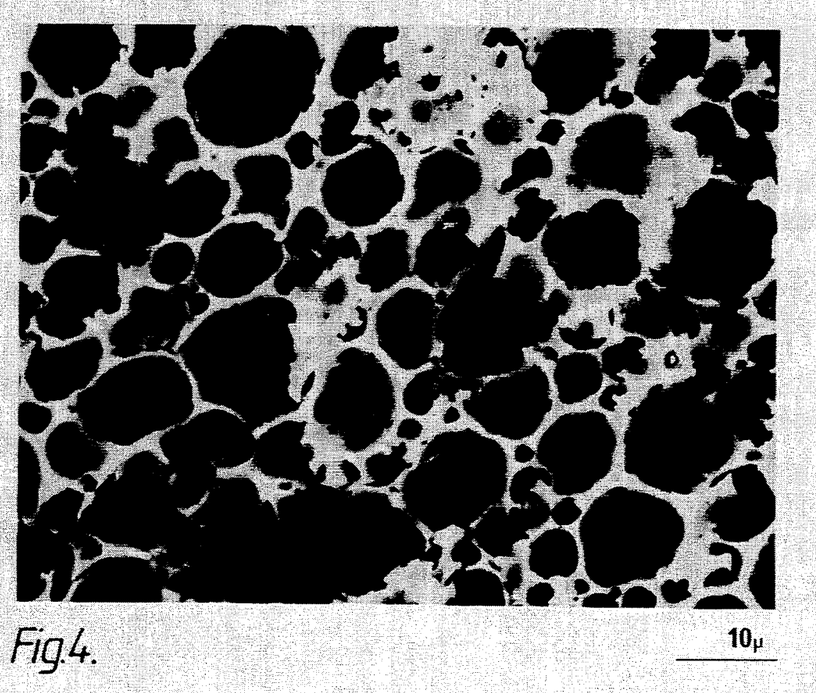
FIG. 4—Scanning electron micrograph of calcined product of the present invention (Example 5).

The dried product has a cumulative pore volume of 7.4 g/cc with 6.1 g/cc between 1 to 10 $\mu$m and specific surface area of 650 $m^2$/g. The product absorbed seven times its weight of 2-methoxyethyl ether. SEM of the product showed three dimensional network structure with cavities connected by holes. FIG. 3 relates to the dried material and FIG. 4 to the calcined material.

EXAMPLE 6

The procedure of Example 5 was repeated except that the air dried product was placed in a meshed bag and soaked in 1M ammonium chloride solution for twenty four hours and then washed with running deionized water and dried at 105° C.

Figure 1:
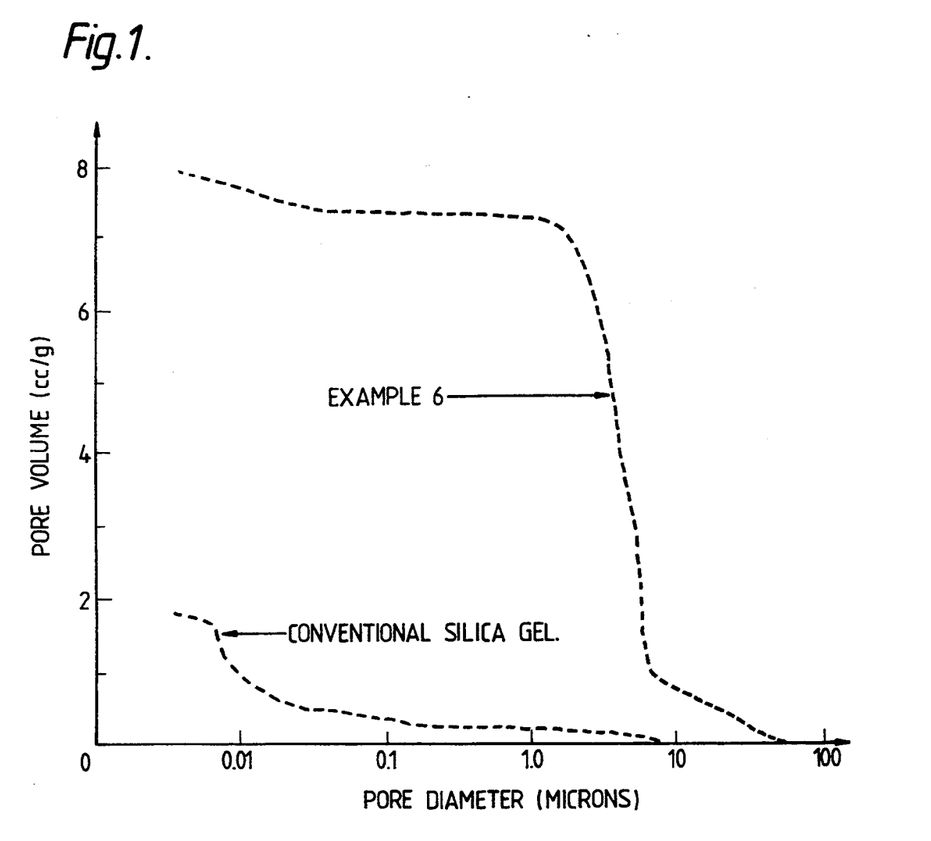
FIG. 1—Porosity trace of conventional silica gel and of the present invention (Example 6).
Figure 2:
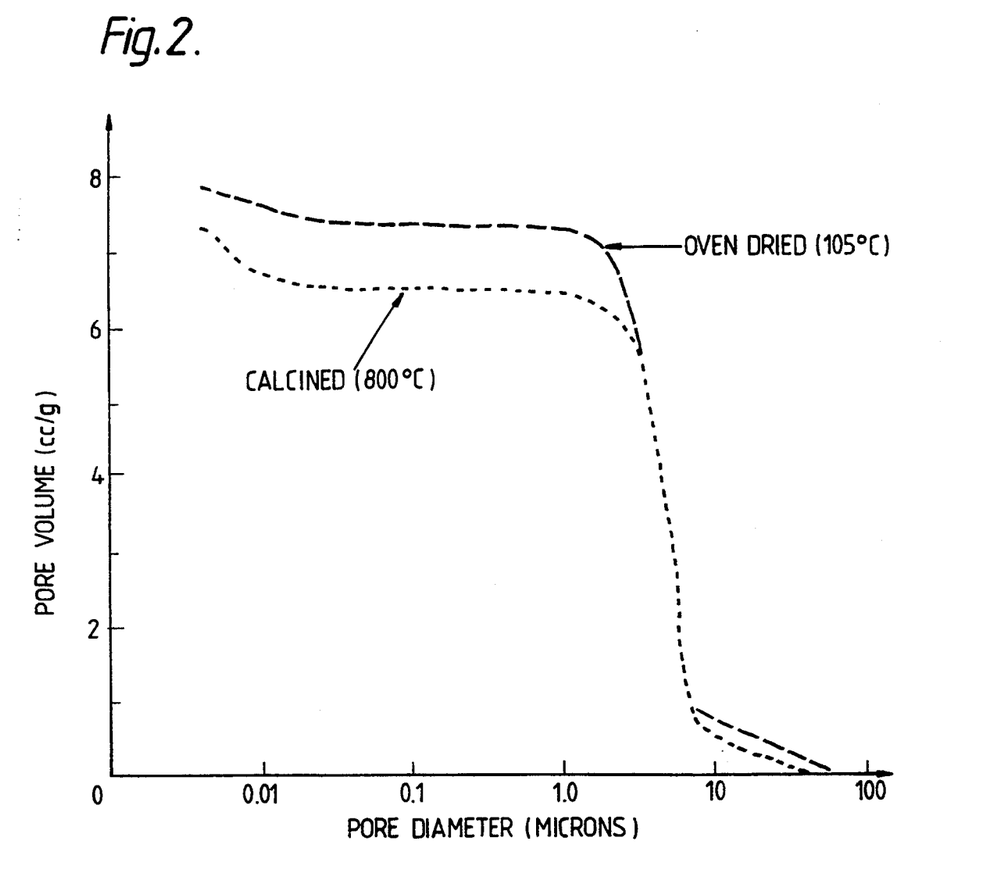
FIG. 2—Porosity trace of calcined (800° C. for one hour) and oven dried product of the present invention (Example 6).

The dried product had a pore volume of 6.3 cc/g between 1 to 10 $\mu$m and specific surface area of 673 $m^2$/g. A portion of the dried product was calcined at 800° C. for one hour. The calcined product had a pore volume of 5.9 cc/g between 1 to 10 $\mu$m and a specific surface area of 630 $m^2$/g (see FIGS. 1 and 2). SEM of the product showed a three dimensional network structure with cavities interconnected by holes.

EXAMPLE 7

44 g of 35% (w/w) aluminium chlorohydrate solution was premixed with 0.4 g Crodateric C in 250 ml plastic beaker. 144 mls of cyclohexane was added to the aluminium chlorohydrate surfactant mixture and stirred using a vibromixer for three minutes. Part of the emulsified aluminium chlorohydrate was gelled by dropping into 25% ammonia solution using a plastic dropping pipette. The gel was left in the ammonia solution for two hours at room temperature, then separated from the ammonia solution and rinsed with water to remove any adhering ammonia solution. The wet product was first air dried, and then washed repeatedly with water and dried at 105° C.

Figure 5:
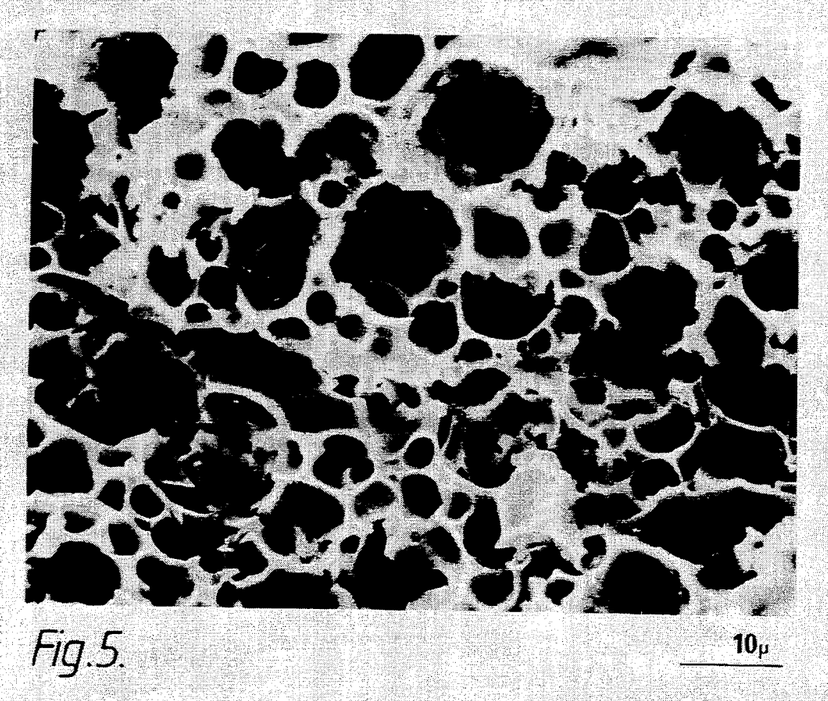
FIG. 5—Scanning electron micrograph of the present invention in which the oxide is alumina (Example 7).

The pore volume of the washed and dried product between 1 and 10 $\mu$m was 2.5 cc/g. SEM of the product showed a three-dimensional network structure with cavities interconnected by holes (FIG. 5).

EXAMPLE 8

The procedure of Example 3 was repeated except that the aluminium chlorohydrate solution was 50% (w/w), 1 g Merpol SH (an ethoxylated alcohol nonionic emulsifying agent sold by Du Pont) in place of Miranol and Crodateric C, and 1.5M ammonium carbonate solution in place of the 25% ammonia solution were used.

Figure 6:
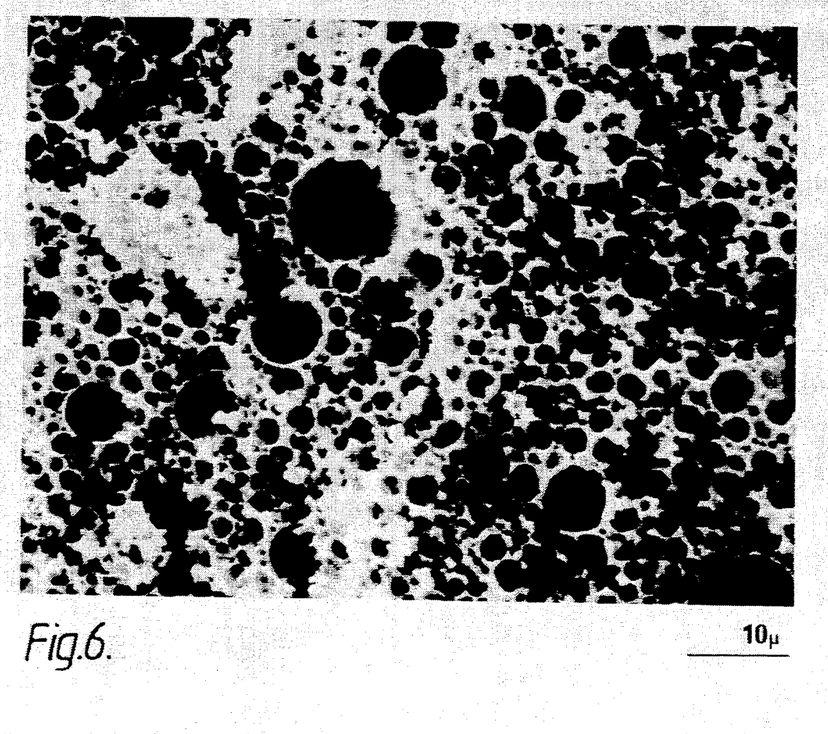
FIG. 6—Scanning electron micrograph of the present invention in which the oxide is alumina (Example 8).

The pore volume of the dried product between 1 to 10 $\mu$m was 2.2 cc/g. SEM of the product showed a three-dimensional network structure with cavities interconnected by holes (FIG. 6).

EXAMPLE 9

The procedure of Example 7 was repeated except that the aluminium chlorohydrate solution was 30% (w/w), 0.3 g of Merpol SH was used in place of Miranol and Crodateric C and the 25% ammonia solution was replaced by a dilute sodium silicate solution containing 15% $SiO_2$ by weight.

Figure 7:
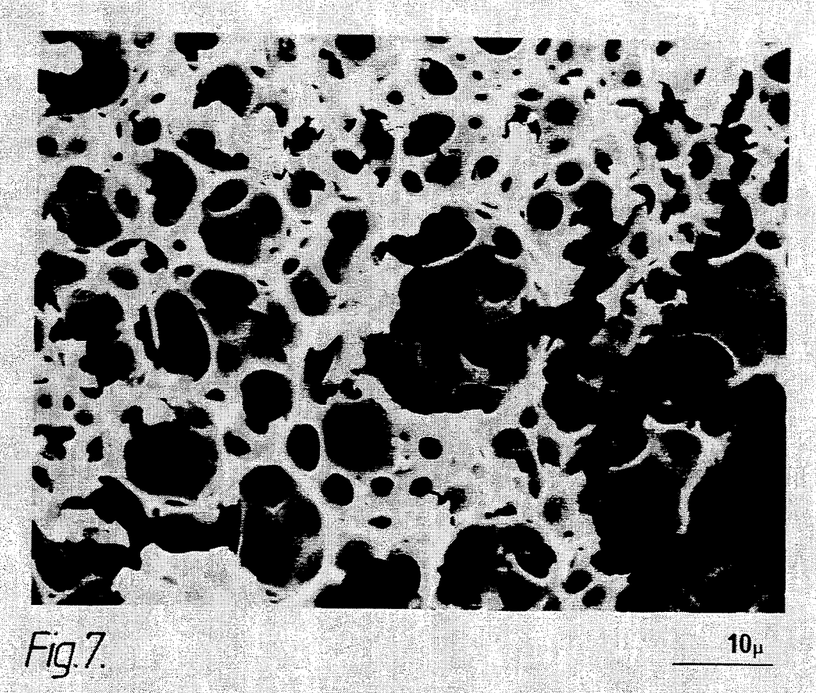
FIG. 7—Scanning electron micrograph of the present invention in which the oxides are alumina-silica (Example 9).

The pore volume of the dried product between 1 to 10 μm was 2.2 cc/g. SEM of the product showed a three-dimensional network structure with cavities interconnected by holes (FIG. 7).

EXAMPLE 10

The procedure of Example 7 was repeated except that the aluminium chlorohydrate solution was replaced by sodium silicate solution containing 15% $SiO_2$ by weight and the 25% ammonia solution was replaced by 30% by weight aluminium chlorohydrate solution.

Figure 8:
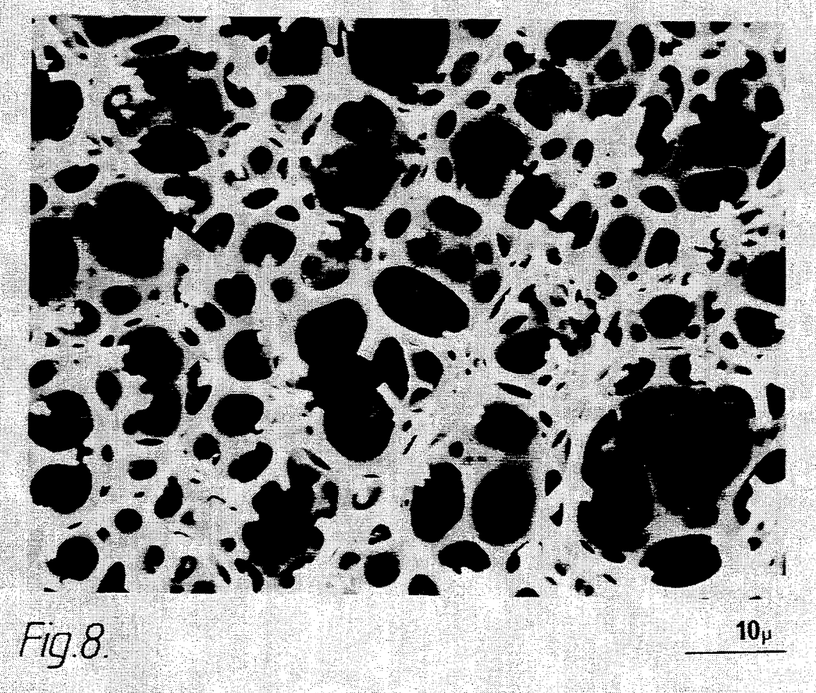
FIG. 8—Scanning electron micrograph of the present invention in which the oxides are silica-alumina (Example 10).

The pore volume of the dried product between 1 to 10 μm was 3.0 g/cc. SEM of the dried product showed a three-dimensional network structure with cavities interconnected by holes (FIG. 8).

EXAMPLE 11

The procedure of Example 7 was repeated, except that the aluminium chlorohydrate solution was replaced by alumino-silicate sol prepared by mixing 53 g acid alum (2.76% $Al_2O_3$, 20% $H_2SO_4$ and 77.24% $H_2O$) and 165 g sodium silicate solution containing 10.4% $SiO_2$ by weight. 0.3 g Merpol SH in place of Miranol and Crodateric C and 1.5M ammonium carbonate solution in place of the 25% ammonia solution were used.

The pore volume of the dried product between 1 to 10 μm was 3.1 cc/g. SEM of the dried product showed a three-dimensional network structure with cavities interconnected by holes.

EXAMPLE 12

The procedure of Example 7 was repeated except that the aluminium chlorohydrate solution was replaced by 40% by weight of zirconium nitrate solution and 0.3 g Merpol SH was used in place or Miranol and Crodateric C.

Figure 9:
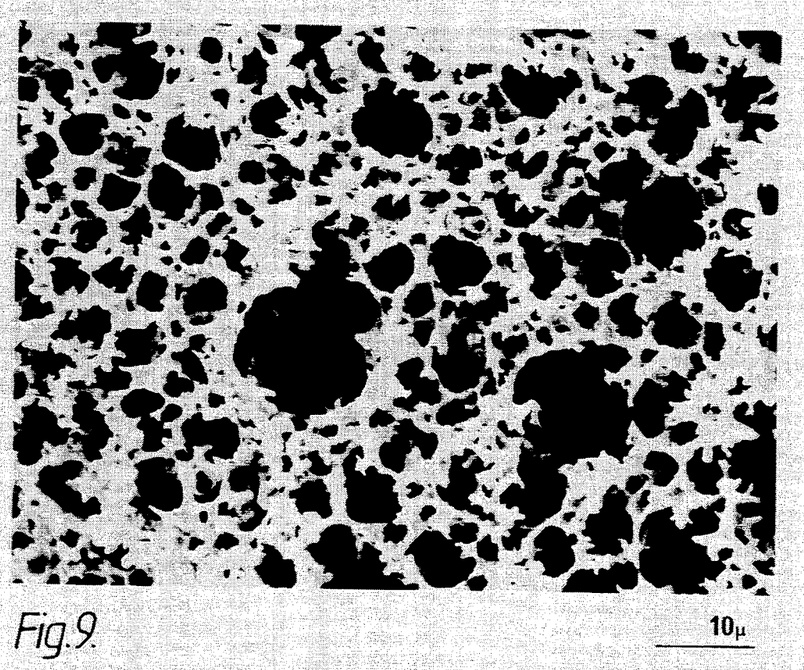
FIG. 9—Scanning electron micrograph of the present invention in which the oxide is zirconia (Example 12).

The pore volume of the dried product between 1 to 10 μm was 3.0 cc/g. SEM of the dried product showed three-dimensional network structure with cavities interconnected by holes (FIG. 9).

EXAMPLE 13

The procedure of Example 7 was repeated except that the aluminium chlorohydrate solution was replaced by a solution containing 4 g zirconium sulphate and 40 g silica-sol (containing 10% silica by weight) and 0.3 g Merpol SH was used in place of the Miranol and Crodateric C.

Figure 10:
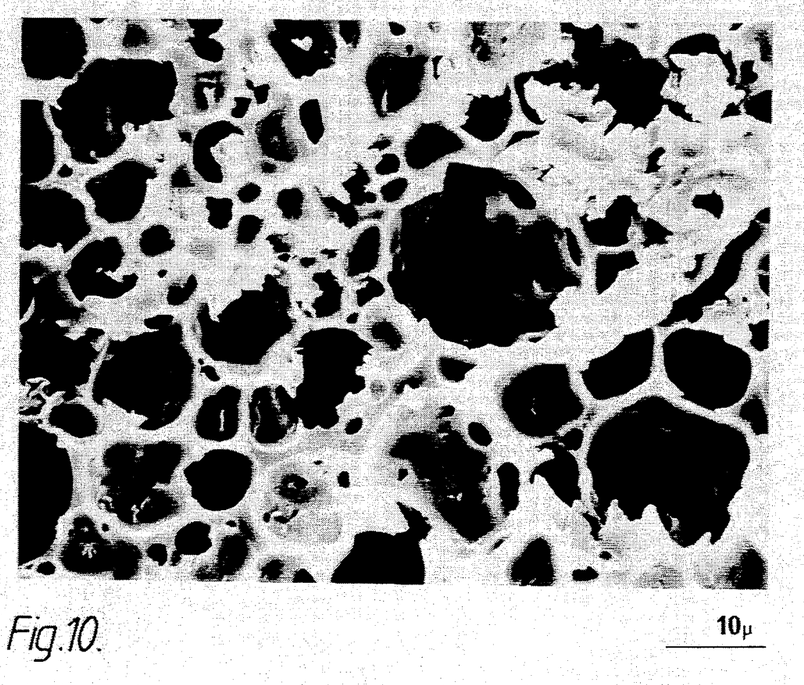
FIG. 10—Scanning electron micrograph of the present invention in which the oxides are zirconia-silica (Example 13).

The pore volume of the dried product between 1 to 10 μm was 2.2 cc/g. SEM of the dried product showed three-dimensional network structure with cavities interconnected by holes (FIG. 10).

EXAMPLE 14

The procedure of Example 7 was repeated except that the aluminium chlorohydrate solution was replaced by sodium silicate solution containing 15% silica by weight and 15% titanium chloride solution was used in place of the 25% ammonia solution.

The pore volume of the dried product between 1 to 10 μm was 3.9 cc/g. SEM of the dried product showed a three-dimensional network structure with cavities interconnected by holes.

EXAMPLE 15

The procedure of Example 7 was repeated except that the aluminium chlorohydrate solution was replaced by a mixture of 30 mls silica sol (containing 12% silica by weight) and 10 mls of 30% titanium sulphate solution. 0.3 g Merpol SH was used in place of Miranol and Crodateric C.

Figure 11:
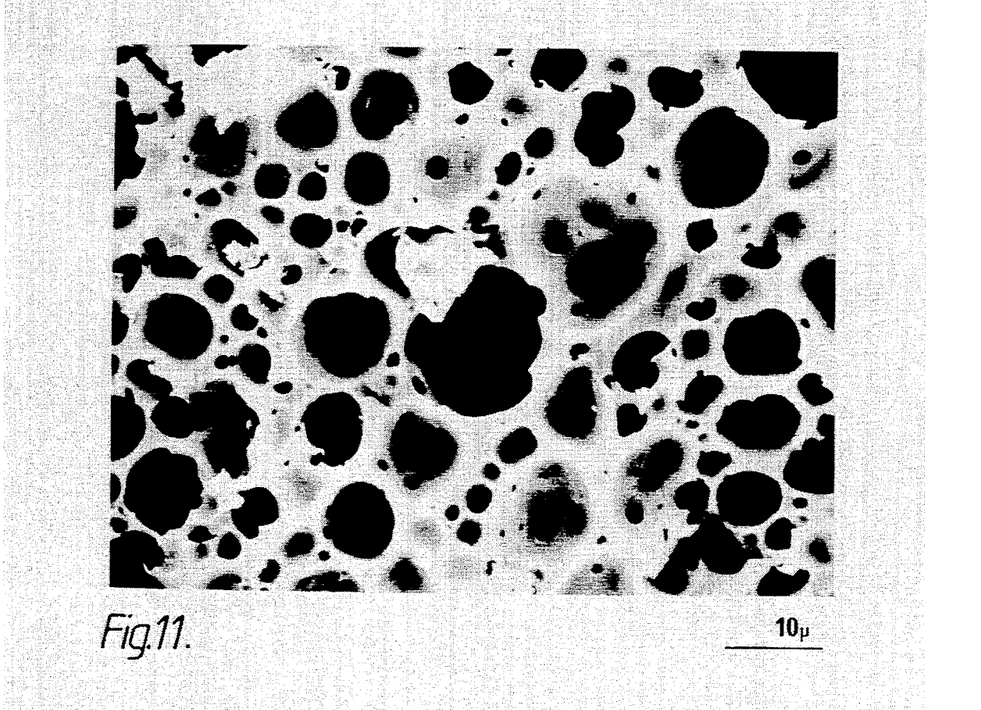
FIG. 11—Scanning electron micrograph of the present invention in which the oxides are titania-silica (Example 15).

The pore volume of the dried product between 1 to 10 μm was 3.2 cc/g. SEM of the dried product showed a three-dimensional network structure with cavities interconnected by holes (FIG. 11).

One outstanding feature of the inorganic structures provided by the present invention is their thermal stability in the presence of sodium contaminants. A sample of inorganic structure prepared according to Example 1, having a sodium content > 1000 ppm, retained a surface area of 700 $m^2/g$ after calcining at 700° C. for one hour. A conventionally set silica gel having a similar original surface area and treated in the same way after calcination, had a final surface area of only 240 $m^2/g$.

Accordingly, the present invention also provides a thermally stable three-dimensional silica structure as previously defined and comprising sodium in an amount from about 1000 to 10000 ppm.

We claim:

1. A three-dimensional porous inorganic oxide structure having a void space in the form of a three-dimensional network of a myriad of cavities separated from each other by thin walls of inorganic oxide and interconnected by holes through said walls, in which the diameters of the cavities are in the range from 1 to 50 μm and the holes have a narrow pore size distribution and have diameters in the range 1 to 10 μm, the structure having a pore volume in the range 1 to 10 μm of at least 2 cc/g and the inorganic oxide being selected from alumina, silica, titania, zirconia and mixtures thereof.

2. A three-dimensional inorganic oxide structure as claimed in claim 1, in an undried state having a pore volume of up to about 50 cc/g.

3. An inorganic oxide structure as claimed in claim 1 in which the pore volume in the range 1 to 10 μm is between 2 and 8 cc/g on a dried product.

4. An inorganic structure as claimed in claim 1 in which the structure comprises silica and contains sodium in an amount from about 1000 to 10000 ppm.

5. An inorganic oxide structure according to claim 1 wherein the oxide consists of silica.

6. A process for preparing a three-dimensional porous inorganic oxide structure having a void space in the form of a three-dimensional network of a myriad of cavities separated from each other by thin walls of inorganic oxide and interconnected by holes through said walls, in which the diameters of the cavities are in the range from 1 to 50 μm and the holes have a narrow pore size distribution and have diameters in the range 1 to 10 μm, the structure having a pore volume in the range 1 to 10 μm of at least 2 cc/g and the inorganic oxide being selected from alumina, silica, titania, zirconia and mixtures thereof, the process comprising (a) forming an oil-in-water emulsion having an oil phase by volume greater than 50% and a continuous aqueous phase by volume less than 50% by adding a water-immiscible fluid to an aqueous solution or sol of a precursor of the inorganic oxide selected from the group comprising alkali-metal aluminates, silicates, titanates and zirconates and water-soluble salts of aluminum, silicon, titanium and zirconium, which yield the related oxide or hydroxide with appropriate chemical treatment, the solution or sol containing an emulsifying agent with a water-immiscible fluid, (b) while maintaining said continuous aqueous phase of the oil-in-water emulsion as a continuous phase, gelling said continuous aqueous phase of the emulsion by the addition of a gelling agent, or by allowing the emulsified inorganic sol to set with time, so as to yield the three-dimensional inorganic oxide structure.

7. A process as claimed in claim 6 in which the immiscible fluid is a volatile water-immiscible liquid and the process includes removing from the product of step (b) the water-immiscible liquid.

8. A process as claimed in claim 7 in which the inorganic oxide is silica and the emulsifying agent is an amphoteric surfactant.

9. A process as claimed in claim 7 in which the inorganic oxide is alumina and the emulsifying agent is a nonionic surfactant.

* * * * *